United States Patent [19]

Pettigrew

[11] Patent Number: 4,720,533

[45] Date of Patent: Jan. 19, 1988

[54] POLYORGANOPHOSPHAZENE CURABLE IN ATMOSPHERE

[75] Inventor: F. Alexander Pettigrew, Baton Rouge, La.

[73] Assignee: Ethyl Corporation, Richmond, Va.

[21] Appl. No.: 888,124

[22] Filed: Jul. 22, 1986

[51] Int. Cl.$^4$ .............................................. C08G 77/04
[52] U.S. Cl. ................................. 528/28; 525/538; 524/588; 524/859; 524/860
[58] Field of Search ............................ 525/538; 528/28

[56] References Cited

U.S. PATENT DOCUMENTS

| | | |
|---|---|---|
| 2,571,039 | 10/1951 | Hyde . |
| 2,843,555 | 7/1958 | Berridge . |
| 3,035,016 | 6/1962 | Bruner . |
| 3,127,363 | 3/1964 | Nitzsche et al. . |
| 3,133,891 | 5/1964 | Ceyzeriat . |
| 3,646,155 | 2/1972 | Scott . |
| 3,702,833 | 11/1972 | Rose et al. .................... 528/392 |
| 3,844,983 | 10/1974 | Reynard et al. ............... 528/168 |
| 3,888,799 | 6/1975 | Rose et al. .................... 528/538 |
| 4,026,839 | 5/1977 | Dieck et al. ................... 525/538 |
| 4,218,556 | 8/1980 | Hergenruther et al. ......... 528/28 |

OTHER PUBLICATIONS

Process Economics Program Report, No. 160, Jun. 1983, pp. 169–171, 187–193.

*Primary Examiner*—Melvyn I. Marquis
*Attorney, Agent, or Firm*—Donald L. Johnson; John F. Sieberth; J. D. Odenweller

[57] ABSTRACT

Organophosphazene polymers having acyloxysilyl or alkoxysilyl substituents are curable at room temperature when exposed to atmosphere containing moisture.

32 Claims, No Drawings

POLYORGANOPHOSPHAZENE CURABLE IN ATMOSPHERE

BACKGROUND OF THE INVENTION

Phosphazene polymers have been known for a very long time (H. N. Stokes, Am. Chem. J., 19 782 (1897)). The first such polymer was a polyphosphonitrilic chloride made by heating cyclic phosphonitrilic chloride trimer to a high temperature. In early research, extensive cross-linking occurred leading to the formation of what was referred to as "inorganic rubber". Such polymers were not soluble in any solvent and were of little use. Later research, notably that of Allcock et al., J. Am. Chem. Soc., 87 4216 (1965), lead to the discovery that use of highly purified cyclic phosphonitrilic chloride trimer and closely controlled heating could yield linear phosphonitrilic chlorides (referred to herein as "chloropolymers") that were soluble in solvents such as benzene, toluene, cyclohexane, tetrahydrofuran and the like. Since the linear chloropolymer could be put into solution, this permitted replacement of the chlorine atoms with any of a broad range of organo groups by reaction of the chloropolymer solution with organic compounds which controlled active hydrogen such as amines or alcohols. Frequently the organic compounds were first converted to their alkali metal derivatives whereby alkali metal chloride formed in the reaction with the chloropolymer and the organo groups were bonded to phosphorus. The most common groups bonded to phosphorus were substituted and unsubstituted alkoxides and aryloxides. Typical substituents were alkyl, cycloalkyl, alkoxy, polyalkoxy, alkenyl, halo, haloalkyl, nitro and the like. Representative examples of substituent groups include methoxy, ethoxy, propoxy, butoxy, dodecyloxy, ethoxyethoxy, butoxyethoxy, ethoxyethoxyethoxyethoxy, trifluoroethoxy, trichloroethoxy, 2,2,3,3,4,4,5,5,6,6-decafluorohexoxy, 2-nitroethoxy, cyclohexoxy, phenoxy, naphthoxy, p-ethylphenoxy, o-ethylphenoxy, p-tert-butylphenoxy, p-sec-dodecylphenoxy, allyl, but-3-enoxy, pent-4-enoxy, o-allylphenoxy, o-(but-3-enyl)phenoxy, p-(pent-4-enyl)phenoxy, o-allyl-p-ethylphenoxy, 4-chlorophenoxy, 4-bromophenoxy, 2,4-dichlorophenoxy, 4-trifluoromethylphenoxy, 4-trichloromethylphenoxy, 4-nitrophenoxy, 2,4-dinitrophenoxy, 2,4,6-trinitrophenoxy and the like.

The phosphazene gum that contains the organic substituents has in the past been cured by use of irradiation and free radical initiators. If the substituents contain groups with olefinic unsaturation, the gum could be cured by sulfur vulcanization as used in the rubber industry. These methods all involve special techniques not available in many uses. For example, it is impractical to cure phosphazene-type caulking compounds by use of free radical (e.g. peroxides) or by sulfur vulcanization as both require heating to an elevated temperature under controlled conditions. Thus a need exists for an organophosphazene polymer which will cure merely upon exposure to the atmosphere.

SUMMARY OF THE INVENTION

It has now been discovered that uncured organophosphazene polymers which contain groups with an alkoxysilyl or acyloxysilyl radical will cure on exposure to the atmosphere as long as the atmosphere contains normal amounts of water, e.g. 20-90 percent relative humidity.

DESCRIPTION OF THE PREFERRED EMBODIMENTS

A preferred embodiment of the invention is an organophosphazene polymer which is curable on exposure to the atmosphere, said polyphosphazene comprising a series of

units in which at least a portion of the substituents on phosphorus contain a group selected from the acyloxysilyl and an alkoxysilyl acid.

Such polyorganophosphazenes are represented by polymers having a polyorganophosphazene which is moisture curable, said polyorganophosphazene comprising a polymer having in any sequence and proportion, repeating units:

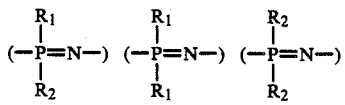

wherein $R_1$ is an organo group and $R_2$ is a group selected from

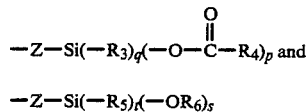

wherein Z is an organo group, $R_3$ and $R_5$ are H or hydrocarbyl, $R_4$ is H or hydrocarbyl, $R_6$ is lower alkyl, p and s are integers from 1 to 3, q and t are integers from 0 to 2, (p+q) equal 3, and (s+t) equals 3.

The organophosphazene polymers may be substantially linear containing from 3 to 50,000 or more

units in its linear backbone or it may cyclic in which about 3-7, more often 3-4, of the units form a ring. Mixtures of both linear and cyclic polymers can also be used.

Except for the groups involved in the cross-linking reaction, the organo groups bonded to phosphorus can be any of the many types of organo groups known to be capable of bonding to phosphorus. These include all those mentioned earlier and others too numerous to recite. The nature of these other organo substituents on phosphorus is not critical. The only essential feature of the phosphazene polymer is that it contains either acyloxysilyl or alkoxysilyl radicals or mixtures of such radicals in amounts sufficient to cure the polymer upon exposure to the atmosphere. In the case of the low molecular weight cyclics, this requires at least two such radicals per molecule. In the case of the high molecular weight linear polymers, the requirement is still only about two such radicals per molecule. In practice, about 1-50 mole percent of the groups bonded to phosphorus will contain acyloxysilyl or alkoxysilyl radicals and more preferably about 2-20 mole percent.

The acyloxysilyl and alkoxysilyl radicals are readily introduced into the phosphazene polymer by initially substituting the chloropolymer with a portion (e.g. 1-50 mole percent, more preferably 2-20 mole percent) of groups which contain olefinic unsaturation. These groups include alkenoxy (e.g. allyloxy, but-3-enyloxy, but-2-enyloxy, etc.) alkenylphenoxy (e.g. 2-allylphenoxy, 4-allylphenoxy, 2-allyl-4-methylphenoxy, 2-methoxy-4-allylphenoxy, and the like). The remaining substituents on phosphorus can be any organo group.

The phosphazene polymers which contain 1-50 mole percent of olefinically unsaturated groups is then reacted with an acyloxy silane or an alkoxy silane. The preferred silanes have the structure:

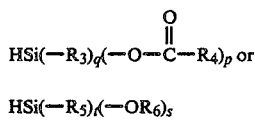

wherein $R_3$ and $R_5$ are hydrogen or hydrocarbyl, $R_4$ is hydrogen or aliphatic hydrocarbyl, $R_6$ is lower alkyl, p and s are integers from 1 to 3, q and t are integers from 0 to 2, (p+q) is 3 and (s+t) is 3. Examples of these are:
acetylsilane;
diacetylsilane;
dimethylacetylsilane;
diphenylacetylsilane;
diethylacetylsilane;
methyldiacetylsilane;
butyldiacetylsilane;
formyl silane;
methyldiformyldisilane;
phenyldiformylsilane;
dipropionyl silane;
methyl dipropionyl silane;
diethylbutanoyl silane;
dioctanoyl silane;
dimethoxysilane;
methyldimethoxysilane;
phenyldiethoxysilane;
methyldipropoxy silane;
dimethylbutoxy silane;
ethyldipentoxy silane;
and the like. The two more preferred silane reactants are methyldiacetylsilane and methyldiethoxysilane.

The amount of silane reactant should be an amount which will provide the desired degree of acyloxysilyl or alkoxysilyl substitution. This can be any amount, e.g. 1-50 mole percent of the total substituent groups, but there is not advantage in exceeding the number of olefinically unsaturated groups.

Under the influence of a platinum catalyst, the silane will add to the olefinic double bond to form the

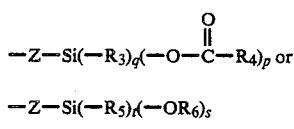

groups. For example, if the olefinic group is an allylphenoxy group, the resulting group will be

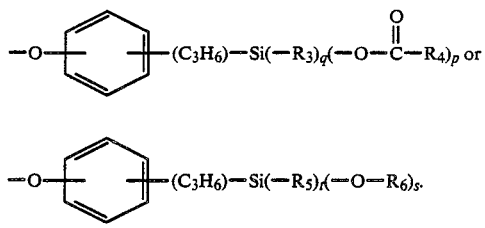

Only a small amount of the platinum catalyst is needed. A useful range is about 1-100 ppm in the reaction mixture. The preferred platinum catalyst is chloroplatinic acid (i.e. $H_2PtCl_6$) including its salts and hydrates.

The uncured organophosphazene polymer, the silane derivative and the platinum catalyst are mixed in a suitable inert solvent such as tetrahydrofuran, dimethoxyethane, dimethoxydiethylene glycol, and the like and the solution heated while stirring at temperatures from about 30° C. up to reflux, preferably under nitrogen. The progress of the hydrosilation reaction can be followed by NMR. When the desired degree of hydrosilation is achieved, the remaining solvent and unreacted silane derivative can be distilled out under vacuum.

The resultant polyorganophosphazene gum having acyloxysilyl or alkoxysilyl substitution can then be mixed with other ingredients to obtain a formulated compound. These include inert fillers (e.g. alumina, magnesia, carbon black, etc.), stabilizers, pigments, processing aids and the like depending upon the intended end use.

The following examples show how to make the atmosphere curing polyorganophosphazenes of the present invention.

EXAMPLE 1

In a reaction vessel was placed 18.8 grams of a 10 weight percent solution of a high molecular weight (1.95 IV in THF) substituted linear polyaryloxyphosphazene which had 53.1 mole percent phenoxy, 39.4 mole percent p-ethylphenoxy and 7.5 mole percent o-allylphenoxy substituents on phosphorus. The mixture was heated under nitrogen at 60° C. with stirring and 0.32 grams of methyl diacetoxysilane and 0.25 ml of a THF solution of $H_2PtCl_6.6H_2O$ (4.2 micro equiv. Pt/ml) were added. After 17 hours, the solvent was evaporated in a stream of nitrogen and the residue vacuum dried at 0.5 mm $H_g$ at room temperature. NMR analysis showed that some hydrosilation of olefinic groups had occurred.

A portion of the hydrosilated gum was exposed to the atmosphere for 1 hour. It was then tested for cure and found to be insoluble in tetrahydrofuran whereas the hydrosilated gum that was not exposed to the atmosphere remained soluble in tetrahydrofuran. Lack of solubility indicates that the polymer had cured.

EXAMPLE 2

In a reaction vessel was placed 3.07 grams of a low molecular weight oily polyaryloxyphosphazene which was a mixture of cyclics and contained 30.3 mole percent phenoxy, 23.9 mole percent p-ethylphenoxy and 45.8 mole percent o-allylphenoxy substituents. To this was added 2.68 grams of methyl diethoxysilane and 0.1µ equiv. of chloroplatinic acid. The mixture was stirred under nitrogen at reflux overnight. The solvent and residual methyl diethoxysilane were distilled out under vacuum. The product was analyzed by NMR which showed that 35% of the olefinic groups had been hydrosilated.

An additional 2 grams of methyl diethoxysilane and 0.1μ equiv. of chloroplatinic acid were added. This mixture was refluxed 2 hours under nitrogen. The heat was removed and the reaction mixture was held at room temperature overnight. The residual volatiles were then removed under vacuum and the product analyzed by NMR which showed 54.7% of the olefinic groups had been hydrosilated.

EXAMPLE 3

In a reaction vessel was placed 3.07 grams of the polyaryloxyphosphazene oil used in Example 2. To this was added 4.93 grams of triethoxysilane and 0.4μ equiv. of chloroplatinic acid. The mixture was refluxed under nitrogen overnight. The remaining volatiles were distilled out under vacuum and the product analyzed by NMR which showed 57% hydrosilation.

EXAMPLE 4

The procedure of Example 3 was repeated except that the catalyst amount was increased to 4.0μ equiv. NMR analysis of the reaction mass showed complete hydrosilation of all allyl groups.

EXAMPLE 5

In a nitrogen filled dry box were combined 2.36 grams of the product of Example 4, 0.55 grams of methyltriacetoxysilane and one drop of a 25 weight percent solution of dibutyl tin laurate. After thorough mixing the mixture was brought out and poured onto a glass plate. Upon standing overnight in the atmosphere the mixture would not flow. A portion of the resultant solid was immersed in THF and was found to neither dissolve or swell. This indicates a high degree of cross-linking.

EXAMPLE 6

In a stainless steel pressure reaction vessel was placed a solution of 40 grams of a mixed polyfluoroalkoxy-phosphazene in which 2.5 mole percent of the substituent groups were o-allylphenoxy dissolved in 360 grams of dry THF. To this was added 33 μl (5μ equiv.) of a platinum-divinyltetramethyldisiloxane complex in toluene. Then 3.24 grams (200 mmole) of methyldiacetoxysilane in 100 ml THF was added and the mixture heated to 150° C. and held at 150° C. for 8 hours. Part of the reaction mixture (221 grams) was then mixed with 3.54 grams of silica filler and the solvent evaporated under a nitrogen stream. The residue was further dried under vacuum and then milled several minutes in a 2-roll mill. It was then compression molded at ambient temperature and the molded plaque placed in a steam autoclave for 5 minutes at 120° C. and an additional hour at 100° C. The plaque was then removed and cut in two. One piece was returned to the autoclave for an additional hour at 120° C. Both pieces were found to be insoluble in THF showing that they were both cross-linked.

I claim:

1. A polyorganophosphazene which is moisture curable, said polyorganophosphazene comprising a polymer having in any sequence and proportion, repeating units:

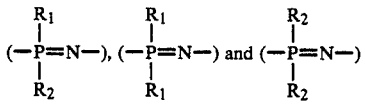

wherein $R_1$ is a substituted or unsubstituted alkoxide or aryloxide group and $R_2$ is a group selected from

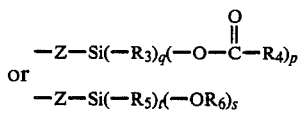

wherein Z is an organo group, $R_3$ and $R_5$ are H or hydrocarbyl, $R_4$ is H or hydrocarbyl, $R_6$ is lower alkyl, p and s are integers from 1 to 3, q and t are integers from 0 to 2, (p+q) equal 3, and (s+t) equal 3.

2. A polyorganophosphazene of claim 1 wherein said repeating units form a linear polymer.

3. A polyorganophosphazene of claim 1 wherein said repeating units form a cyclic polymer.

4. A polyorganophosphazene of claim 1 wherein $R_2$ is

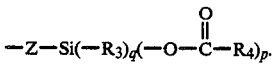

5. A polyorganophosphazene of claim 4 wherein $R_4$ is a $C_{1-12}$ alkyl.

6. A polyorganophosphazene of claim 5 wherein $R_4$ is methyl.

7. A polyorganophosphazene of claim 6 wherein p is 2, q is 1 and $R_3$ is methyl.

8. A polyorganophosphazene of claim 4 wherein Z is selected from divalent alkylenoxy, arylenoxy or alkylene aryloxy groups wherein oxygen is bonded to phosphorus.

9. A polyorganophosphazene of claim 8 wherein Z is

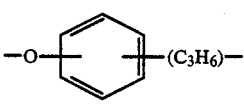

10. A polyorganophosphazene of claim 9 wherein $R_4$ is methyl.

11. A polyorganophosphazene of claim 10 wherein p is 2, q is 1 and $R_3$ is methyl.

12. A polyorganophosphazene of claim 1 wherein $R_2$ is

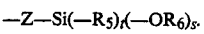

13. A polyorganophosphazene of claim 12 wherein $R_6$ is a $C_{1-4}$ alkyl.

14. A polyorganophosphazene of claim 13 wherein $R_5$ is methyl and $R_6$ is ethyl.

15. A polyorganophosphazene of claim 12 wherein Z is selected from divalent alkylenoxy, arylenoxy or alkylene aryloxy groups wherein oxygen is bonded to phosphorus.

16. A polyorganophosphazene of claim 15 wherein Z is

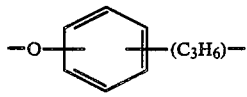

17. A polyorganophosphazene of claim 16 wherein $R_6$ is a $C_{1-4}$ alkyl and $R_5$ is methyl.

18. A polyorganophosphazene of claim 17 wherein s is 2 and t is 1.

19. A polyorganophosphazene of claim 1 wherein $R_1$ is selected from substituted or unsubstituted alkoxy or aryloxy groups.

20. A polyorganophosphazene of claim 19 wherein $R_1$ is phenoxy, alkylphenoxy, alkoxyphenoxy, halophenoxy, alkenylphenoxy or any combination thereof.

21. A polyorganophosphazene of claim 20 wherein $R_2$ is

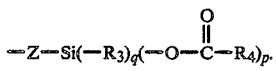

22. A polyorganophosphazene of claim 21 wherein $R_3$ and $R_4$ are methyl, p is 2 and q is 1.

23. A polyorganophosphazene of claim 22 wherein $R_1$ is phenoxy, alkylphenoxy or combinations thereof.

24. A polyorganophosphazene of claim 23 wherein Z is

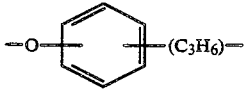

25. A polyorganophosphazene of claim 20 wherein $R_2$ is

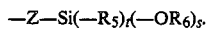

26. A polyorganophosphazene of claim 25 wherein $R_6$ is a $C_{1-4}$ alkyl.

27. A polyorganophosphazene of claim 26 wherein $R_6$ is ethyl and $R_5$ is methyl.

28. A polyorganophosphazene of claim 27 wherein $R_1$ is phenoxy, alkylphenoxy or combinations thereof.

29. A polyorganophosphazene of claim 28 wherein Z is

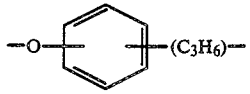

and oxygen is bonded to phosphorus.

30. An organophosphazene polymer which is curable on exposure to the atmosphere containing an average amount of water, said polyphosphazene comprising a series of

units in which at least a portion of the substituents on phosphorus contain an acyloxysilyl group and the remaining groups are selected from substituted or unsubstituted alkoxy and aryloxy groups.

31. A polymer of claim 30 wherein said acyloxysilyl is an acetyldimethylsilyl group.

32. A polymer of claim 30 wherein said acyloxysilyl group is a diacetylmethylsilyl group.

* * * * *